United States Patent
Han et al.

(10) Patent No.: US 9,584,761 B2
(45) Date of Patent: Feb. 28, 2017

(54) VIDEOCONFERENCE TERMINAL, SECONDARY-STREAM DATA ACCESSING METHOD, AND COMPUTER STORAGE MEDIUM

(71) Applicant: ZTE Corporation, Shenzhen, Guangdong (CN)

(72) Inventors: Guanzhen Han, Shenzhen (CN); Peng Ding, Shenzhen (CN); Tinggan Shi, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/905,868

(22) PCT Filed: Jun. 20, 2014

(86) PCT No.: PCT/CN2014/080458
§ 371 (c)(1),
(2) Date: Jan. 18, 2016

(87) PCT Pub. No.: WO2015/007137
PCT Pub. Date: Jan. 22, 2015

(65) Prior Publication Data
US 2016/0156877 A1   Jun. 2, 2016

(30) Foreign Application Priority Data
Jul. 19, 2013  (CN) .......................... 2013 1 0313593

(51) Int. Cl.
*H04N 7/15*   (2006.01)
*H04N 7/14*   (2006.01)
*H04L 29/06*  (2006.01)

(52) U.S. Cl.
CPC .............. *H04N 7/15* (2013.01); *H04L 65/605* (2013.01); *H04N 7/147* (2013.01)

(58) Field of Classification Search
CPC ........................................................ H04N 7/15
(Continued)

(56) References Cited

U.S. PATENT DOCUMENTS 7,292,590 B1*  11/2007  Chen ..................... H04M 7/006
                                                             370/352
2003/0009524 A1*  1/2003  Kenoyer .................. G09B 5/06
                                                             709/205

(Continued)

FOREIGN PATENT DOCUMENTS

CN    101094382 A    12/2007
CN    101102459 A    1/2008
(Continued)

OTHER PUBLICATIONS

International Search Report in international application No. PCT/CN2014/080458, mailed on Aug. 15, 2014.
(Continued)

*Primary Examiner* — Gerald Gauthier
(74) *Attorney, Agent, or Firm* — Oppedahl Patent Law Firm LLC

(57) ABSTRACT

Disclosed is a secondary-stream data accessing method for a videoconference terminal. The method includes: playing secondary-stream data using a playing tool installed in the videoconference terminal, and collecting video data or audio video data of the secondary-stream data; and coding the collected video data or the collected audio video data and sending the coded video data or the coded audio video data to a target videoconference terminal. Further disclosed are a videoconference terminal and a computer storage medium.

15 Claims, 3 Drawing Sheets

(58) Field of Classification Search
USPC ......... 348/14.01, 14.03, 14.07, 14.08, 14.09;
375/240.03, 240.24; 709/205, 231;
370/264, 401
See application file for complete search history.

(56) References Cited

U.S. PATENT DOCUMENTS

| | | |
|---|---|---|
| 2004/0022202 A1 | 2/2004 | Yang |
| 2005/0140780 A1 | 6/2005 | Yang |
| 2005/0185601 A1 | 8/2005 | Yang |
| 2005/0254440 A1* | 11/2005 | Sorrell ............. H04L 29/06027 370/264 |
| 2005/0286444 A1 | 12/2005 | Yang |
| 2007/0171274 A1* | 7/2007 | Yim .................... H04L 12/1813 348/14.08 |
| 2011/0060992 A1 | 3/2011 | Jevons |
| 2011/0074910 A1* | 3/2011 | King ..................... H04M 3/567 348/14.03 |
| 2011/0169910 A1* | 7/2011 | Khot ........................ H04N 7/15 348/14.09 |
| 2011/0205331 A1* | 8/2011 | Kato ..................... H04N 7/147 348/14.08 |
| 2012/0206562 A1 | 8/2012 | Yang |
| 2013/0057642 A1* | 3/2013 | Catchpole ........... H04L 12/1827 348/14.08 |
| 2013/0077696 A1* | 3/2013 | Zhou .................... H04N 19/176 375/240.24 |
| 2013/0091296 A1* | 4/2013 | Edholm ................. H04N 7/152 709/231 |
| 2013/0106975 A1* | 5/2013 | Chu ....................... H04M 3/567 348/14.01 |
| 2013/0106984 A1* | 5/2013 | Wu .......................... H04N 7/15 348/14.08 |
| 2013/0151623 A1 | 6/2013 | Weiser |
| 2014/0118471 A1* | 5/2014 | Guo ........................ H04N 7/155 348/14.09 |
| 2014/0198173 A1 | 7/2014 | Willig |
| 2014/0241419 A1* | 8/2014 | Holmer ............... H04L 65/4069 375/240.03 |
| 2014/0292999 A1* | 10/2014 | Do ........................ H04L 65/608 348/14.07 |
| 2015/0156458 A1* | 6/2015 | Whynot ................. H04N 7/152 348/14.09 |
| 2016/0156877 A1* | 6/2016 | Han ....................... H04N 7/147 348/14.08 |

FOREIGN PATENT DOCUMENTS

| | | |
|---|---|---|
| CN | 101141615 A | 3/2008 |
| CN | 101646049 A | 2/2010 |
| WO | 2013026457 A1 | 2/2013 |

OTHER PUBLICATIONS

English Translation of the Written Opinion of the International Search Authority in international application No. PCT/CN2014/080458, mailed on Aug. 15, 2014.

Supplementary European Search Report in European application No. 14826638.0, mailed on Jul. 5, 2016.

* cited by examiner

VIDEOCONFERENCE TERMINAL, SECONDARY-STREAM DATA ACCESSING METHOD, AND COMPUTER STORAGE MEDIUM

TECHNICAL FIELD

The disclosure relates to the secondary-stream data accessing technology for videoconferences, and in particular to a videoconference terminal, a secondary-stream data accessing method, and a computer storage medium.

BACKGROUND

Videoconferencing is a technique that enables people in different places to implement "real-time, visual and interactive" multimedia communication through a transmission medium. It can send a variety of information, such as a static/dynamic image of a person, a voice, a text, a picture to terminal devices of respective users by means of various existing electrical communication transmission media, such that users geographically dispersed can come together and exchange information by variety of ways such as a graph and a voice, through which the users can better understand the content of the exchanged information and thus seem to be having a conference in a same venue.

With the rapid development of technology, a videoconference terminal tends to have high audio/video definition and to be VoBB-enabled. In order to meet new business requirement of a user, the videoconference terminal tends to have increasingly complex functions, and besides the most basic videoconferencing business function, the videoconference terminal is required to have functions such as supporting transmission of document description or document presentation, i.e. a function of supporting double stream transmission. Data for the double stream transmission includes: main-stream data and other audio/video stream data other than the main-stream data, for example, a presented document on the screen of a computer, audio/video stream data on a storage device, etc.

Currently, in order to meet the new business requirement of the user, the double stream function is implemented through connection of an external device, secondary-stream data of the external device is sent to the videoconference terminal through logic switching, and then the secondary-stream data is collected and coded by the videoconference terminal. The prior art has following disadvantages: there are too many audio/video interfaces in the videoconference terminal, such that not only an aesthetic appearance of a product and the strength of a structural member are affected, but also users need to have a professional training so as to know how to operate it; for voice extension input and Video Graphics Array (VGA) video output of a computer, a very long audio/video cable is required, such that the wiring of the conference room is not convenient, and the quality of signal is affected.

SUMMARY

In order to resolve the technical problems described above, the embodiments of the present disclosure provide a videoconference terminal, a secondary-stream data accessing method, and a computer storage medium.

The secondary-stream data accessing method for a videoconference terminal provided by an embodiment of the disclosure includes:

secondary-stream data are played using a playing tool installed in a videoconference terminal, and video data or audio video data of the secondary-stream data are collected; and the collected video data or the collected audio video data are coded and the coded video data or the coded audio video data are sent to a target videoconference terminal.

In an embodiment, before the secondary-stream data are played using the playing tool installed in the videoconference terminal, the method may further include:

the secondary-stream data are generated by editing using the playing tool installed in the videoconference terminal; and/or the secondary-stream data are sent to the videoconference terminal via an external device.

In an embodiment, the step that video data or audio video data of the secondary-stream data are collected may include:

at least one of operations as follows is performed on the secondary-stream data using the playing tool installed in the videoconference terminal: editing, deleting, marking, annotating and plotting; and video data or audio video data of an operation result generated from the operation performed on the secondary-stream data are collected.

In an embodiment, the step that video data or audio video data of the secondary-stream data are collected may include:

in the case that there are multiple channels of secondary-stream data, operation results generated from the operations performed on the multiple channels of secondary-stream stream data are displayed in an interface according to a set display layout, and video data or audio video data of the operation results in the interface are collected.

In an embodiment, the step that video data or audio video data of the secondary-stream data are collected may include:

in the case that there are multiple channels of secondary-stream data, one of the multiple channels of secondary-stream data is selected, the operation is performed on the selected one channel of secondary-stream data, and video data or audio video data of an operation result generated from the operation performed on the selected one channel of secondary-stream data are collected.

In an embodiment, the playing tool may include at least one of the following tools: a document editing tool, an image processing tool, a media playing tool, an image browsing tool, and a reading tool.

The videoconference terminal provided by an embodiment of the disclosure includes a playing unit, a collecting unit, a coding unit, and a sending unit, in which:

the playing unit is configured to play secondary-stream data using a playing tool installed in the videoconference terminal;

the collecting unit is configured to collect video data or audio video data of the secondary-stream data;

the coding unit is configured to code the collected video data or the collected audio video data; and the sending unit is configured to send the coded video data or the coded audio video data to a target videoconference terminal.

In an embodiment, the videoconference terminal may further include a generating unit and/or a receiving unit, in which:

the generating unit is configured to generate the secondary-stream data by editing using the playing tool installed in the videoconference terminal; and the receiving unit is configured to receive the secondary-stream data sent by an external device.

In an embodiment, the videoconference terminal may further include an operating unit, in which the operating unit is configured to perform at least one of operations as follows on the secondary-stream data using the playing tool installed in the videoconference terminal: deleting, marking, annotating and plotting; and the collecting unit is further configured to collect video data or audio video data of an operation result generated from the operation performed on the secondary-stream data.

In an embodiment, the collecting unit may further include a first collecting sub-unit configured to, in the case that there are multiple channels of secondary-stream, display operation results generated from the operations performed on the multiple channels of secondary-stream data in an interface according to a set display layout and collect video data or audio video data of the operation results in the interface.

In an embodiment, the collecting unit may further include a second collecting sub-unit configured to, in the case that there are multiple channels of secondary-stream data, select one of the multiple channels of secondary-stream data, perform the operation on the selected one channel of secondary-stream data, and collect video data or audio video data of an operation result generated from the operation performed on the selected one channel of secondary-stream data.

In an embodiment, the playing tool may include at least one of the following tools: a document editing tool, an image processing tool, a media playing tool, an image browsing tool, and a reading tool.

A computer storage medium provided by an embodiment of the disclosure has stored therein a computer program for performing the aforementioned secondary-stream data accessing method.

In the videoconference terminal and the secondary-stream data accessing method therefor provided by embodiments of the present disclosure, secondary-stream data are played using a playing tool installed in the videoconference terminal; video data or audio video data of the secondary-stream data are collected; and the collected video data or audio video data are coded and the coded video data or the coded audio video data are sent to a target videoconference terminal. In this way, the secondary-stream data can be played directly using a playing tool installed in a videoconference terminal, and an external device is not required to be connected through an interface of the videoconference terminal so as to play the secondary-stream data, thereby reducing the number of interfaces of the videoconference terminal and resulting in convenient user operations; a video data cable or an audio video data cable is no longer required for voice extension input and VGA video output of a computer, thereby simplifying the wiring of the conference room, and improving the quality of signal.

DETAILED DESCRIPTION

In order to understand in more detail characteristics and technical content of embodiments of the present disclosure, implementation of the embodiments of the present disclosure will be elaborated below with reference to the accompanying figures which are for reference only and are not intended to limit the embodiments of the present disclosure.

Figure 1:
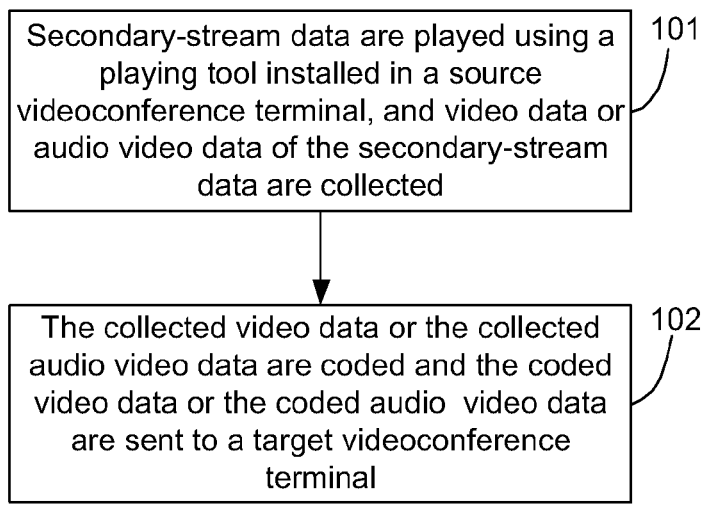
FIG. 1 is a schematic flow chart of a secondary-data accessing method for a videoconference terminal according to an embodiment of the present disclosure.

An embodiment of the present disclosure describes a secondary-stream data accessing method for a videoconference terminal, as shown in FIG. 1, the method includes steps as follows.

Step 101, secondary-stream data are played using a playing tool installed in a videoconference terminal, and video data or audio video data of the secondary-stream data are collected.

The videoconference terminal is provided with multiple interfaces, each of the interfaces is connected via a corresponding cable to a specific external device, such as a camera, a microphone, a television, a computer and a sound equipment, etc. Among these interfaces, there are both inputting type interfaces and outputting type interfaces. The inputting type interfaces are connected to inputting devices such as a camera, a microphone, a computer, etc. And the outputting type interfaces are connected to outputting devices such as, a television, a computer and a sound equipment, etc. Preferably, the inputting type interface may further be divided into a main inputting interface and a secondary inputting interface, data obtained by the main inputting interface through an inputting device are main-stream data, and data obtained by the secondary inputting interface through an inputting device are secondary-stream data. There is no substantial difference between the main-stream data and the secondary-stream data, and the main-stream data and the secondary-stream data are only used to differentiate between two channels of stream data; and, there may be multiple secondary inputting interfaces, thus multiple channels of secondary-stream data may be obtained.

In general, the main-stream data must be obtained through an external device, for example, a camera and a microphone; while acquisition of the secondary stream data only includes displaying of and performing operations on documents on the external device, for example, presentation of an office document. Therefore, in order to simply a great variety of interfaces of the videoconference terminal and reduce part of unnecessary secondary inputting interfaces, before the step that the secondary-stream data are played using the playing tool installed in the videoconference terminal, the method further includes: a required playing tool is installed in the videoconference terminal.

Preferably, the playing tool may include at least one of: a document editing tool, an image processing tool, a media playing tool, an image browsing tool, and a reading tool.

Here, the installed playing tool can play secondary-stream data, for example, a document presentation tool can play documents with a filename extension .ppt.

Therefore, the playing tool may be used to play the required documents in the videoconference terminal directly.

Preferably, when the secondary-stream data are played, the displayed picture may be displayed through a television or a projector connected with the videoconference terminal.

Preferably, before the step that the secondary-stream data are played using the playing tool installed in the videoconference terminal, the method may further include:

the secondary-stream data are generated by editing using the playing tool installed in the videoconference terminal; and/or the secondary-stream data are sent to the videoconference terminal via an external device.

Specifically, the played secondary-stream data may be obtained in two ways. On one hand, the required secondary-stream data may be edited directly by a playing tool of the videoconference terminal and then edited secondary-stream data may be played at any time. One the other hand, the required secondary-stream data may be copied from an external device, for example, a computer and a storage card, and stored in the videoconference terminal, and then the secondary-stream data may be played at any time.

Preferably, the step that video data or audio video data of the secondary-stream data are collected may include:

at least one of operations as follows is performed on the secondary-stream data using the playing tool installed in the videoconference terminal: editing, deleting, marking, annotating and plotting; and video data or audio video data of an operation result generated from the operation performed on the secondary-stream data are collected.

Here, when a user presents an editing operation on the secondary-stream data, it is necessary to collect pictures during the presentation of the editing operation, therefore, it is necessary to collect video data or audio video data of an operation result generated from the operation performed on the secondary-stream data, not just collect the video data or audio video data of the secondary-stream data.

Preferably, the step that video data or audio video data of the secondary-stream data are collected may include:

in the case that there are multiple channels of secondary-stream data, operation results generated from the operations performed on the multiple channels of secondary-stream data are displayed in an interface according to a set display layout, and video data or audio video data of the operation results in the interface are collected.

Specifically, multiple channels of video data or audio video data of the multiple channels of secondary-stream data may be merged into one channel of video data or audio video data, and the merged one channel of video data or audio video data are displayed in an interface according to a set display layout as the operation results generated from the operations performed on the multiple channels of secondary-stream data. For example, the multiple channels of secondary-stream data corresponds to multiple playing pictures, the multiple playing pictures are played respectively and independently in different regions of the interface and don't affect each other, and the multiple playing pictures may also be played in the interface in a stacked way based on an order of priority.

Preferably, the step that video data or audio video data of the secondary-stream data are collected may include:

in the case that there are multiple channels of secondary-stream data, one of the multiple channels of secondary-stream data is selected, the operation is performed on the selected one channel of secondary-stream data, and video data or audio video data of an operation result generated from the operation performed on the selected one channel of secondary-stream data are collected.

Step 102, the collected video data or the collected audio video data are coded and the coded video data or the coded audio video data are sent to a target videoconference terminal.

Here, audio data coding protocols include following audio coding standards set by the international telecommunication union: G.711, G.722, G.728, G. 729, etc.

Here, video data coding protocols include following video coding standards set by the international telecommunication union: H.261, H.263, etc.

Preferably, after the collected video data or the collected audio video data are coded, the method may further include: the collected video data or the collected audio video data are encapsulated based on a network protocol.

The video data or audio video data can be transmitted over network after being encapsulated.

Preferably, the step that the collected video data or the collected audio video data are coded and the coded video data or the coded audio video data are sent to a target videoconference terminal may include: the collected video data or the collected audio video data are coded and the coded video data or the coded audio video data are sent to the target videoconference terminal through network.

In step 101, when one of the multiple channels of secondary-stream data is played, another channel of secondary-stream data may be played by means of switching; correspondingly, the method may further include: the one channel of video data or audio video data is coded and the coded one channel of video data or audio video data is sent to the target videoconference terminal.

Figure 2:
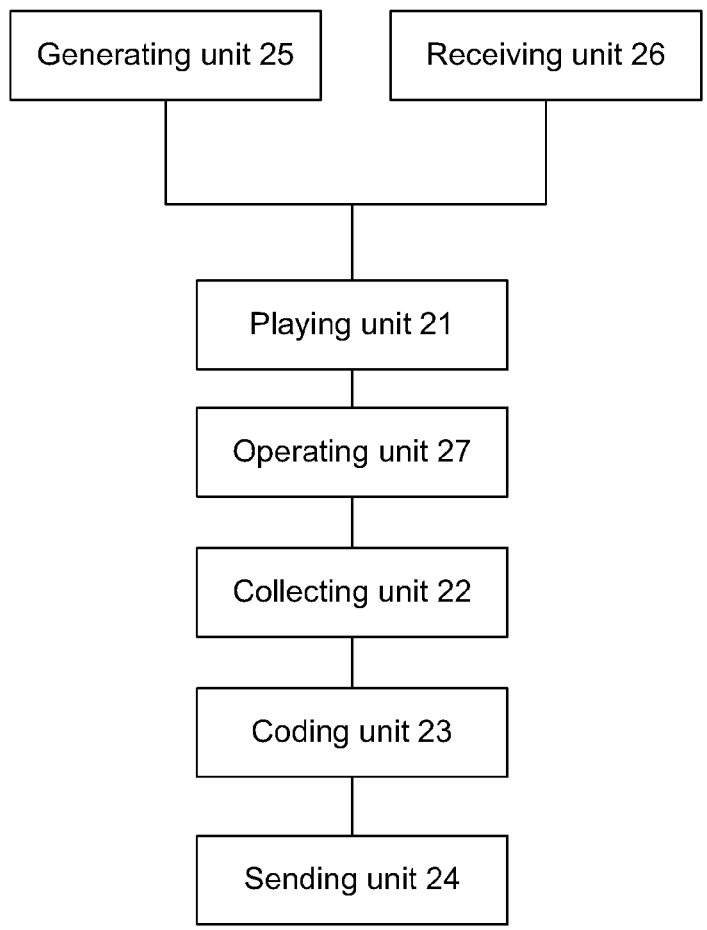
FIG. 2 is a schematic structural diagram of a videoconference terminal according to an embodiment of the present disclosure.

For the secondary-stream data accessing method for the videoconference terminal, a videoconference terminal is further provided according to an embodiment of the present disclosure, as shown in FIG. 2, the videoconference terminal includes: a playing unit 21, a collecting unit 22, a coding unit 23 and a sending unit 24, in which:

the playing unit 21 is configured to playing secondary-stream data using a playing tool installed in the videoconference terminal;

the collecting unit 22 is configured to collect video data or audio video data of the secondary-stream data;

the coding unit 23 is configured to code the collected video data or the collected audio video data; and the sending unit 24 is configured to send the coded collected video data or the coded audio video data to a target videoconference terminal.

The playing tool includes at least one of the following tools: a document editing tool, an image processing tool, a media playing tool, an image browsing tool, and a reading tool.

Preferably, the videoconference terminal may further include a generating unit 25 and/or a receiving unit 26, in which:

the generating unit 25 is configured to generate the secondary-stream data by editing using the playing tool installed in the videoconference terminal; and the receiving unit 26 is configured to receive the secondary-stream data sent by an external device.

Preferably, the videoconference terminal may further include an operating unit 27, in which the operating unit 27 is configured to perform at least one of operations as follows on the secondary-stream data using the playing tool installed in the videoconference terminal: deleting, marking, annotating and plotting; and the collecting unit 22 is further configured to collect video data or audio video data of an operation result generated from the operation performed on the secondary-stream data.

Preferably, the collecting unit 22 may further include a first collecting sub-unit configured to, in the case that there are multiple channels of secondary-stream, display operation results generated from the operations performed on the multiple channels of secondary-stream data in an interface according to a set display layout and collect video data or audio video data of the operation results in the interface.

Preferably, the collecting unit 22 may further include a second collecting sub-unit configured to, in the case that there are multiple channels of secondary-stream data, select one of the multiple channels of secondary-stream data, perform the operation on the selected one channel of secondary-stream data, and collect video data or audio video data of an operation result generated from the operation performed on the selected one channel of secondary-stream data.

In an actual application, the playing unit 21 of the videoconference terminal may be implemented by a player of the videoconference terminal; the coding unit 23 may be implemented by a coder of the videoconference terminal; the collecting unit 22, the sending unit 24, the generating unit 25, the receiving unit 26 and the operating unit 27 may be implemented by a Central Processing Unit (CPU), a Digital Signal Processor (DSP), or a Field-Programmable Gate Array (FPGA) of the videoconference terminal.

It should be understood by those skilled in the art that, a function implemented by each unit or its sub-unit of the videoconference terminal shown in FIG. 2 may be understood in reference to the related description of the secondary-stream data accessing method for the videoconference terminal described above. The function of each unit or its sub-unit of the videoconference terminal shown in FIG. 2 may be implemented by a program executed on a processor, and may also be implemented by a specific logic circuit.

If functions implemented by the playing unit 21, the collecting unit 22, the coding unit 23, the sending unit 24, the generating unit 25, the receiving unit 26 and the operating unit 27 of the videoconference terminal according to the embodiments of the disclosure are implemented by software function modules sold or used as separate products, and the software function modules may also be stored on a computer readable storage medium. Based on the above, the technical solutions according to embodiments of the disclosure in essence or the part contributing to the prior art may be embodied in the form of a software product, the computer software product is stored in a storage medium, and the computer software product includes several instructions which allow a computer device (may be a personal computer, a server or a network device, etc) to perform all or part of the method of each embodiment of the present disclosure. And the storage medium includes: an usb flash disk, a mobile hard disk, a Read-only Memory (ROM), a disk or an optical disc and other medium which can store a program code. In this way, the embodiments of the present disclosure are not limited to any specific combination of hardware and software.

Correspondingly, it is further provided a computer storage medium having stored therein a computer program for performing the secondary-stream data accessing method according to an embodiment of the present disclosure.

Figure 3:
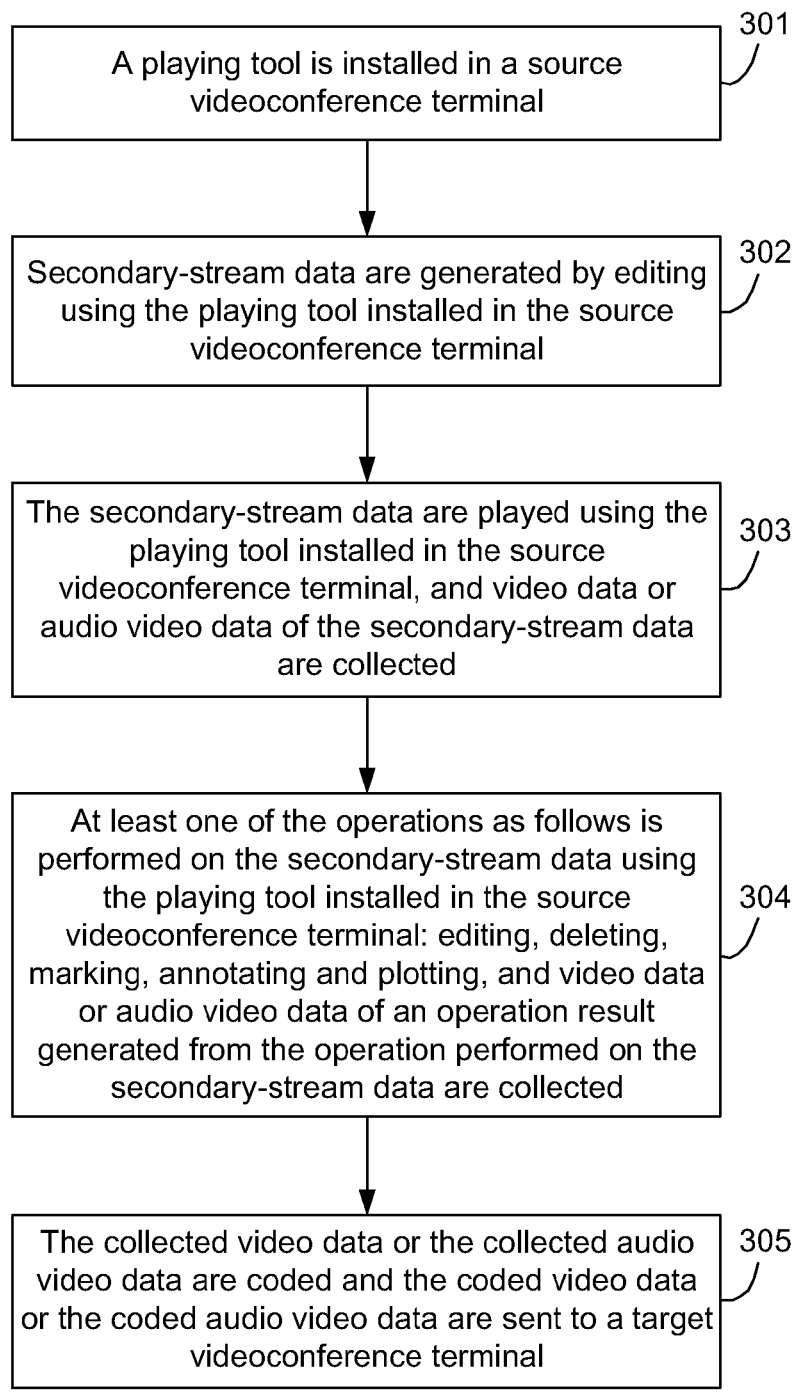
FIG. 3 is a first schematic flow chart of a secondary-data accessing method for a videoconference terminal according to an embodiment of the present disclosure.

In light of the secondary-stream data accessing method for the videoconference terminal and function of each unit of the videoconference terminal, it is further provided a secondary-stream data accessing method for a videoconference terminal, as shown in FIG. 3, the method includes steps as follows.

Step 301, a playing tool is installed in a videoconference terminal.

Here, the playing tool includes: a document editing tool, an image processing tool, a media playing tool, an image browsing tool, and a reading tool.

Step 302, secondary-stream data are generated by editing using the playing tool installed in the videoconference terminal.

Step 303, the secondary-stream data are played using the playing tool installed in the videoconference terminal, and video data or audio video data of the secondary-stream data are collected.

Step 304, at least one of operations as follows is performed on the secondary-stream data using the playing tool installed in the videoconference terminal: editing, deleting, marking, annotating and plotting, and video data or audio video data of an operation result generated from the operation performed on the secondary-stream data are collected.

Step 305, the collected video data or the collected audio video data are coded and the coded video data or the coded audio video data are sent to a target videoconference terminal.

Figure 4:
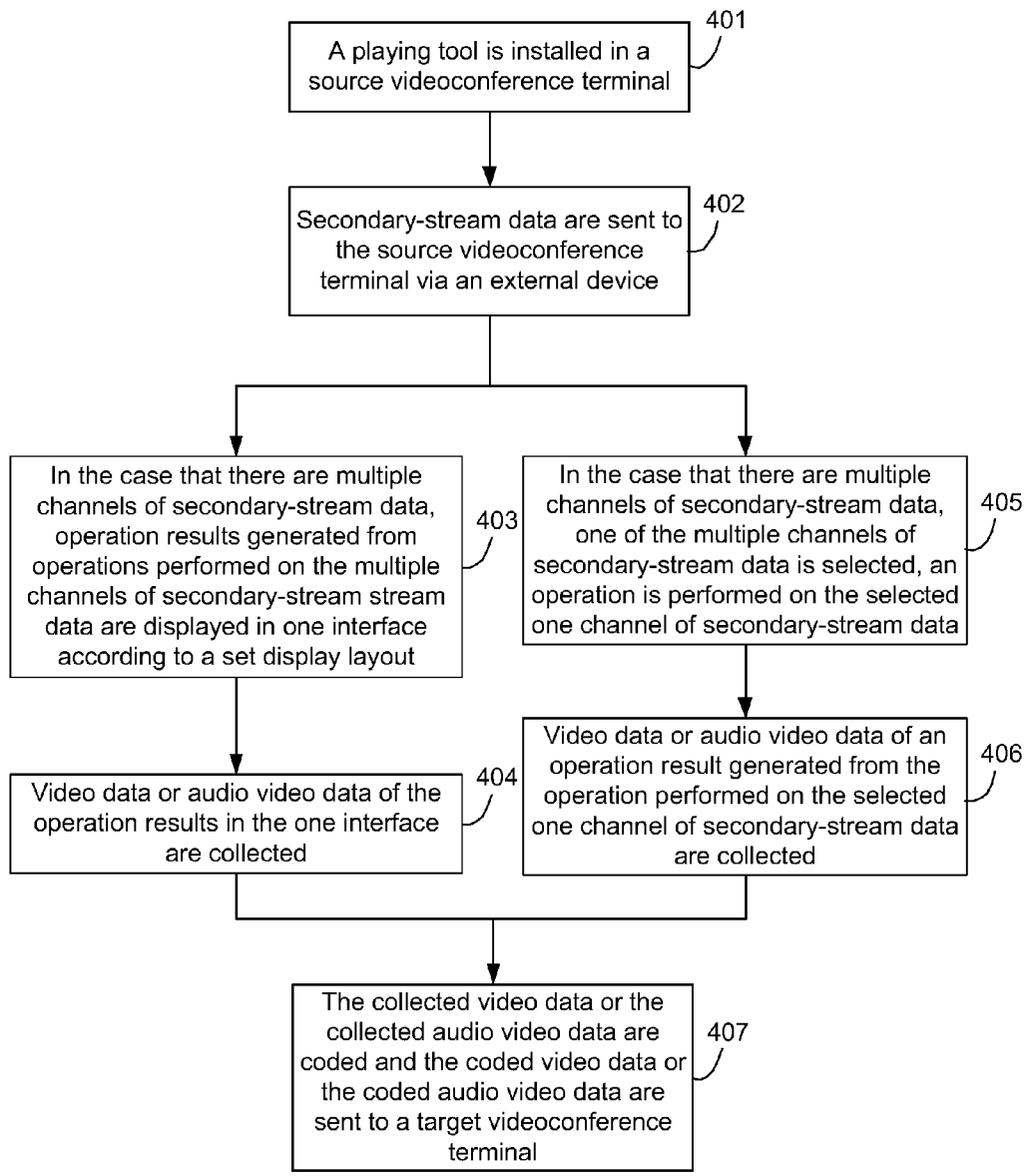
FIG. 4 is a second schematic flow chart of a secondary-data accessing method for a videoconference terminal according to an embodiment of the present disclosure.

In light of the secondary-stream data accessing method for the videoconference terminal and function of each unit of the videoconference terminal, it is further provided a secondary-stream data accessing method for a videoconference terminal, as shown in FIG. 4, the method includes steps as follows.

Step 401, a playing tool is installed in a videoconference terminal.

Here, the playing tool includes: a document editing tool, an image processing tool, a media playing tool, an image browsing tool, and a reading tool.

Step 402, secondary-stream data are sent to the videoconference terminal via an external device, and step 403 or step 405 is performed.

Step 403, in the case that there are multiple channels of secondary-stream data, operation results generated from operations performed on the multiple channels of secondary-stream stream data are displayed in an interface according to a set display layout.

Step 404, video data or audio video data of the operation results in the interface are collected, and step 407 is performed.

Step 405, in the case that there are multiple channels of secondary-stream data, one of the multiple channels of secondary-stream data is selected, an operation is performed on the selected one channel of secondary-stream data.

Specifically, the operations include: editing, and/or deleting, and/or marking, and/or annotating, and/or plotting.

Step 406, video data or audio video data of an operation result generated from the operation performed on the selected one channel of secondary-stream data are collected.

Step 407, the collected video data or the collected audio video data are coded and the coded video data or the coded audio video data are sent to a target videoconference terminal.

What described above is merely preferable embodiments of the present disclosure and is not intended to limit the scope of protection of the present disclosure.

The invention claimed is:

1. A secondary-stream data accessing method for a videoconference terminal, comprising:
    playing secondary-stream data using a playing tool installed in the videoconference terminal, and collecting video data or audio video data of the secondary-stream data;

coding the collected video data or the collected audio video data and sending the coded video data or the coded audio video data to a target videoconference terminal, wherein the collecting video data or audio video data of the secondary-stream data comprises:

performing at least one of operations as follows on the secondary-stream data using the playing tool installed in the videoconference terminal: editing, deleting, marking, annotating and plotting;

in response to the operation performed on the secondary-stream data, displaying the secondary-stream data and an operation result generated from the operation performed on the secondary-stream data; and collecting video data or audio video data of both the secondary-stream data and the operation result generated from the operation performed on the secondary-stream data.

2. The method according to claim 1, further comprising:
before playing the secondary-stream data using the playing tool installed in the videoconference terminal,
generating the secondary-stream data by editing using the playing tool installed in the videoconference terminal; and/or
sending the secondary-stream data to the videoconference terminal via an external device.

3. The method according to claim 2, wherein the collecting video data or audio video data of the secondary-stream data comprises:
in the case that there are multiple channels of secondary-stream data, displaying, in an interface according to a set display layout, operation results generated from the operations performed on the multiple channels of secondary-stream stream data, and collecting video data or audio video data of the operation results in the an interface.

4. The method according to claim 2, wherein the collecting video data or audio video data of the secondary-stream data comprises:
in the case that there are multiple channels of secondary-stream data, selecting one of the multiple channels of secondary-stream data;
performing the operation on the selected one channel of secondary-stream data; and
collecting video data or audio video data of an operation result generated from the operation performed on the selected one channel of secondary-stream data.

5. The method according to claim 1, wherein the playing tool comprises at least one of the following tools: a document editing tool, an image processing tool, a media playing tool, an image browsing tool, and a reading tool.

6. A videoconference terminal, comprising: a playing unit, a collecting unit, a coding unit, and a sending unit,
wherein the playing unit is configured to play secondary-stream data using a playing tool installed in the videoconference terminal;
wherein the collecting unit is configured to collect video data or audio video data of the secondary-stream data;
wherein the coding unit is configured to code the collected video data or the collected audio video data; and
wherein the sending unit is configured to send the coded video data or the coded audio video data to a target videoconference terminal,
wherein the videoconference terminal further comprises:
an operating unit, configured to perform at least one of operations as follows on the secondary-stream data using the playing tool installed in the videoconference terminal: deleting, marking, annotating and plotting; and wherein the collecting unit is further configured to:
in response to the operation performed on the secondary-stream data, display the secondary-stream data and an operation result generated from the operation performed on the secondary-stream data; and
collect video data or audio video data of both the secondary-stream data and the operation result generated from the operation performed on the secondary-stream data.

7. The videoconference terminal according to claim 6, further comprising a generating unit and/or a receiving unit,
wherein the generating unit is configured to generate the secondary-stream data by editing using the playing tool installed in the videoconference terminal; and
wherein the receiving unit is configured to receive the secondary-stream data sent by an external device.

8. The videoconference terminal according to claim 7, wherein the collecting unit further comprises a first collecting sub-unit configured to, in the case that there are multiple channels of secondary-stream data, display operation results generated from the operations performed on the multiple channels of secondary-stream data in an interface according to a set display layout and collect video data or audio video data of the operation results in the an interface.

9. The videoconference terminal according to claim 7, wherein the collecting unit further comprises a second collecting sub-unit configured to, in the case that there are multiple channels of secondary-stream data, select one of the multiple channels of secondary-stream data, perform the operation on the selected one channel of secondary-stream data, and collect video data or audio video data of an operation result generated from the operation performed on the selected one channel of secondary-stream data.

10. The videoconference terminal according to claim 6, wherein the playing tool comprises at least one of the following tools: a document editing tool, an image processing tool, a media playing tool, an image browsing tool, and a reading tool.

11. A non-transitory computer storage medium having stored therein a computer executable instruction for performing a secondary-stream data accessing method for a videoconference terminal, the method comprising:
playing secondary-stream data using a playing tool installed in the videoconference terminal, and collecting video data or audio video data of the secondary-stream data;
coding the collected video data or the collected audio video data and sending the coded video data or the coded audio video data to a target videoconference terminal,
wherein the collecting video data or audio video data of the secondary-stream data comprises:
performing at least one of operations as follows on the secondary-stream data using the playing tool installed in the videoconference terminal: editing, deleting, marking, annotating and plotting;
in response to the operation performed on the secondary-stream data, displaying the secondary-stream data and an operation result generated from the operation performed on the secondary-stream data; and
collecting video data or audio video data of both the secondary-stream data and the operation result generated from the operation performed on the secondary-stream data.

12. The non-transitory computer storage medium according to claim 11, wherein the method further comprises:
    before playing the secondary-stream data using the playing tool installed in the videoconference terminal,
    generating the secondary-stream data by editing using the playing tool installed in the videoconference terminal; and/or
    sending the secondary-stream data to the videoconference terminal via an external device.

13. The non-transitory computer storage medium according to claim 12, wherein the collecting video data or audio video data of the secondary-stream data comprises:
    in the case that there are multiple channels of secondary-stream data, displaying, in an interface according to a set display layout, operation results generated from the operations performed on the multiple channels of secondary-stream stream data, and collecting video data or audio video data of the operation results in the an interface.

14. The non-transitory computer storage medium according to claim 12, wherein the collecting video data or audio video data of the secondary-stream data comprises:
    in the case that there are multiple channels of secondary-stream data, selecting one of the multiple channels of secondary-stream data;
    performing the operation on the selected one channel of secondary-stream data; and
    collecting video data or audio video data of an operation result generated from the operation performed on the selected one channel of secondary-stream data.

15. The non-transitory computer storage medium according to claim 11, wherein the playing tool comprises at least one of the following tools: a document editing tool, an image processing tool, a media playing tool, an image browsing tool, and a reading tool.

\* \* \* \* \*